June 26, 1956
J. FRIED
2,751,825
PINHOLE CAMERA
Filed Jan. 30, 1952
2 Sheets-Sheet 1
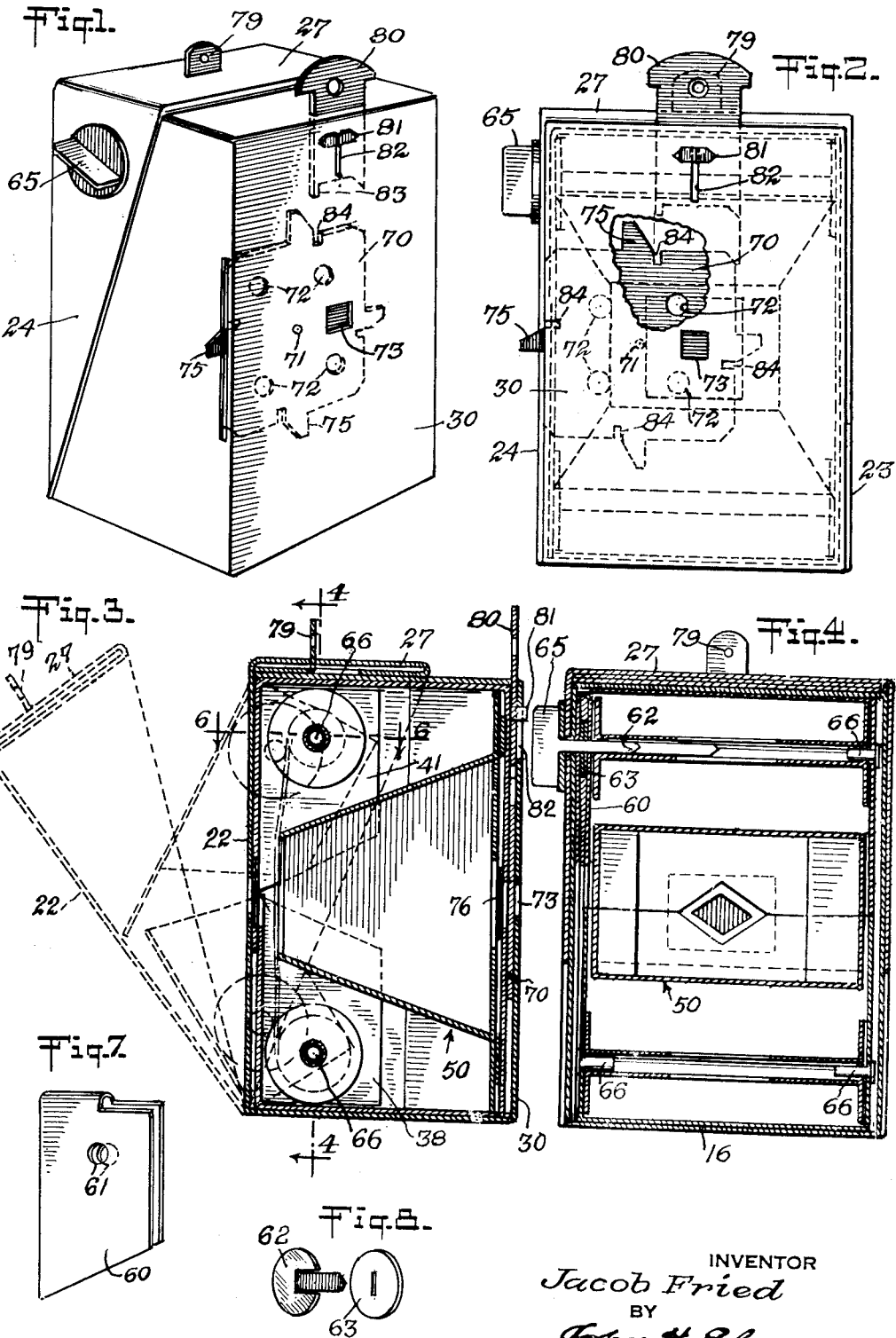
INVENTOR
Jacob Fried
BY
John H. Glaccum
ATTORNEY June 26, 1956 J. FRIED 2,751,825
PINHOLE CAMERA
Filed Jan. 30, 1952 2 Sheets-Sheet 2
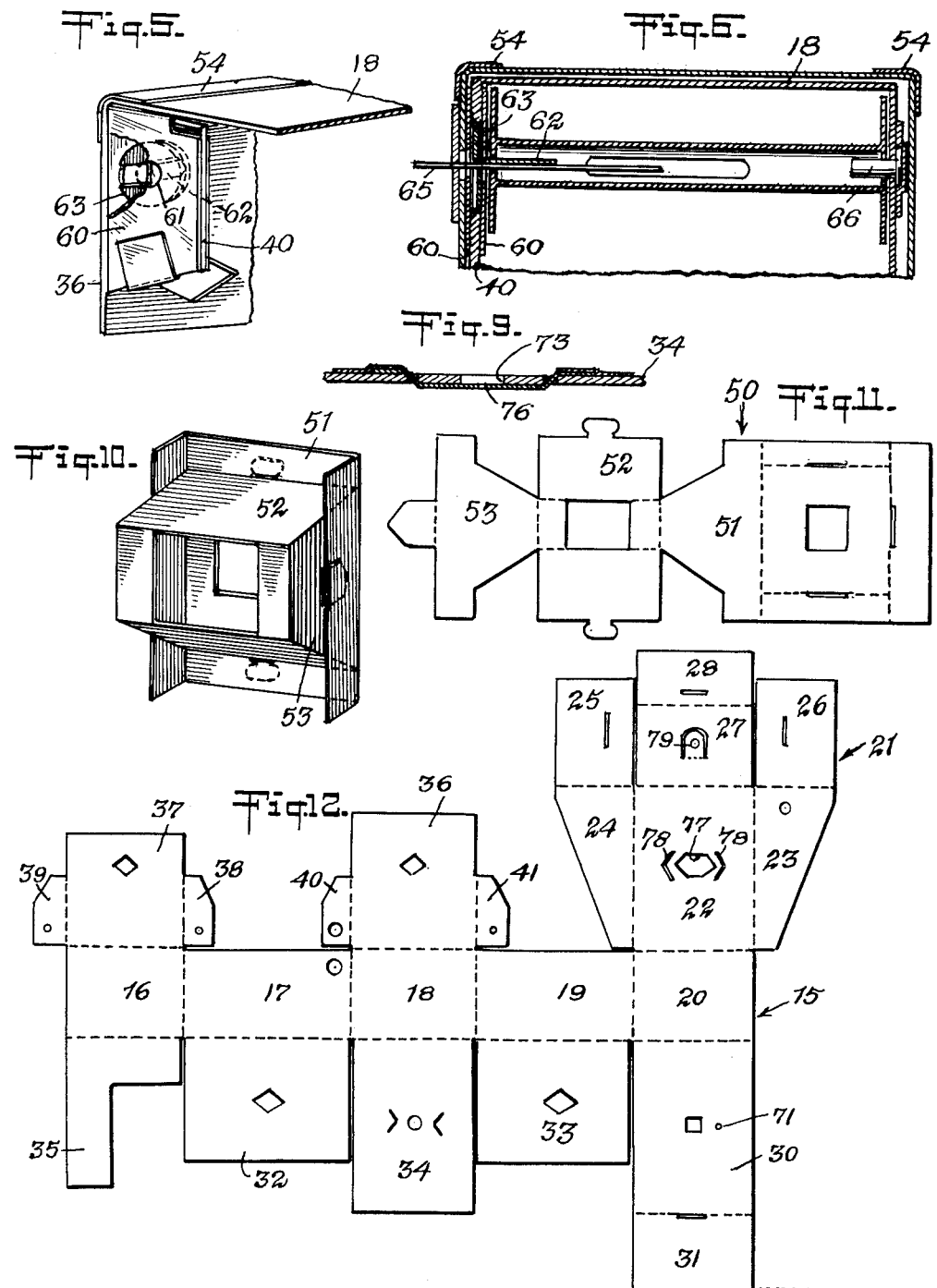
INVENTOR
Jacob Fried
BY
John H. Glaccum
ATTORNEY United States Patent Office 2,751,825
Patented June 26, 1956

2,751,825

PINHOLE CAMERA

Jacob Fried, Bronx, N. Y.

Application January 30, 1952, Serial No. 268,991

1 Claim. (Cl. 95—11)

This invention relates to cameras and more particularly to a foldable camera or more specifically one which may be assembled from a few precut sheets which may be previously die cut and scored and furnished as a prefabricated unit in a prepared kit. Primarily my camera is a pinhole camera for time exposures and is an improvement and refinement of my Patent No. 2,559,214, issued July 3, 1951.

An object of the improvement is to provide a blank ready to be folded to form, together with suitable instructions and all the necessary parts such as film-roll supporting rivets, paper shutter, pinhole paper, etc., in such form as to be sold in stores at low cost.

A particular object of the improvement is to provide a better shutter and I provide a rotary shutter which instead of having a reciprocating movement, as in my prior patent, has a rotary or continuous movement which permits easier use and handling and prevents confusion. This particular shutter makes it possible to get clearer, sharper time exposures even if the camera is held in the hands close to the face.

A further object is to provide improved spool holders and an improved film framer.

A still further object is to provide a simplified viewfinder which not only acts as a view-finder but in an inoperative position acts as a lock on the shutter to prevent the accidental turning thereof.

In addition to the foregoing my improved shutter has a number of other advantages over my prior patent, all of which will be apparent from the specification and drawings.

Further and more specific objects, features and advantages will more clearly appear from a consideration of the detailed specification hereinafter set forth, especially when taken in connection with the accompanying drawings which illustrate a present preferred form which the invention may assume and which form part of the specification.

In brief and general terms, the invention comprises a blank of suitable material such as cardboard which includes a plurality of sections, flaps, and tabs joined by crease lines capable of being folded into assembled position to form an actual operable simple and efficient camera with a pinhole diaphragm and a rotatable shutter and a pivoted back which can be swung open or closed to remove or to insert a regular film. This idea, and device embodying the same, is immensely attractive to young people and can be used in many ways associated with advertising or publicity campaigns and yet really gives the public something real and useful as a prize or gift or premium.

It will be understood that I have provided a prefabricated unit consisting of simple diecut and scored members which may be assembled by an adult or child to present an operable unit which will take good pictures and which will use standard film.

In the accompanying drawings—

Fig. 1 is a perspective view of an assembled camera embodying my invention.

Fig. 2 is a front view partly in section showing the camera.

Fig. 3 is a side view of the camera in cross-section.

Fig. 4 is a cross-sectional view taken on the line 4—4 of Fig. 3.

Fig. 5 is a detailed view in perspective of a corner of the top of the camera.

Fig. 6 is a view taken on the line 6—6 of Fig. 3.

Fig. 7 is a detailed view of the metal facing for strengthening the tab supporting the keyholder and spool.

Fig. 8 is a perspective view of the keyholder and washer.

Fig. 9 is a detailed view in cross-section of the lens opening.

Fig. 10 is a perspective view of the film framer assembled.

Fig. 11 is a view of the blank from which the film frame is made.

Fig. 12 is an outline of the blank from which the camera proper is made.

Referring more particularly to the drawings, the outer portion of the camera is made from the blank 15 which is made up of a plurality of sections. Sections 16, 17, 18, 19 and 20 when folded into place form the top, bottom and two sides of the camera, members 18 being the top and 17 and 19 the side walls and 20 and 16 the bottom structure. Attached to the member 20 is the back member 21 consisting of a center portion 22, sides 23 and 24, flaps 25 and 26 and the top thereof 27 with a depending portion 28. Also attached to the member 20 is a front member 30 with a flap 31. Members 32, 33 and 34 combined with the member 30 and with the flap 35 take up the front of the camera. Each of these is apertured to provide for the pinhole lens. Flaps 36 and 37 constitute the spool carrying members when folded, and it will be noted that their depending flaps 38, 39 and 41 are apertured to receive a stud to support a spool. The flap 40 is provided with a slightly larger aperture to receive the keyholder 62 and the washer 63.

The picture framer 50 is composed of segments 51, 52 and 53. It will be noted that 52 and 53 have tabs which are adapted to engage corresponding slots in the member 51. When the various parts are folded and put together the film framer will fit inside the camera and tend only to frame a better picture but also to support and position the film should slack occur.

It will be understood that as the camera is put together the corners thereof may be reinforced with tape such as shown in Figures 5 and 6 at 54.

In order to reinforce the spool carrying section 40 and to provide means for operating the camera I provide a small reinforcing plate 60 which is bent upon itself and provided with an opening 61. This supports a keyholder 62 and washer 63 which is positioned within the sides of the metal clip. A simple key member 65 is inserted through the aperture into the interior of the film roll in order that the film may be wound. Mounted in the openings of the tabs 38, 39 and 41 are studs 66 to support the spool while the tab 40 supports the keyholder 62 with its accompanying washer 63.

I also provide a shutter member 70 which is pivoted between the front walls at 71. The shutter member 70 is provided with a plurality of apertures 72 which will register with the opening 73 in the front of the camera. It will be understood that the front wall of the camera consists of four layers 30, 32, 33 and 34 plus the segment 35 and that the aperture in each of these members registers. The shutter is pivoted on the pin 71 on the member 30. The shutter has a plurality of operating handles 75 and is limited in its travel so that the downward movement of the handle will move one of the apertures therein in a line with the opening and the second movement will close the shutter. The lens consists of a pinhole 76 which is preferably made of thin paper pasted across the member 34, and the back of the camera is provided with an opening 77 over which a piece of transparent red paper is pasted through the slots 78.

The panel 27 is die cut to form a rear sight member 79, and a forward sight member 80 is provided. The member 80 performs two functions. The member 80 is mounted by means of a clip 81 in a slot 82 and has a depending finger 83. When pushed to the downward position the depending finger 83 will engage the notch 84 in the shutter to lock it into place and to prevent an accidental exposure. When the camera is to be used the sight is moved to the upward position. When it is desired to use the camera the back is opened and a roll of film is inserted on the studs 66 in the customary way and the end of the film is attached to an empty spool mounted on the corresponding stud 66 at the top of the camera and the keyholder member 62. The back of the camera is then closed and the key inserted through the opening, thus locking the camera in the closed position. The key is wound in the normal manner and the number of the film will appear in the rear aperture 77. As each picture is taken the film is moved to the next film to be exposed.

Cameras of this type are time cameras and the shutter must be opened for a few seconds time depending upon the light and other circumstances involved.

While I have shown a specific form of my invention, certain modifications and changes may be made without departing from the spirit thereof, and I do not wish to be limited to the specific form shown.

I claim:

A camera construction formed of one piece of material foldable upon itself to form bottom, top and side walls and a front section composed of a plurality of thicknesses, an aperture through said front wall, a pin hole lens positioned in one of said front walls and a shutter rotatably mounted adjacent said aperture, said shutter having a plurality of openings therein and a plurality of operating handles whereby the movement of one of said handles will expose said pin hole lens while the movement of the successive handle will cover said pin hole lens said shutter being notched adjacent said handles, a front and rear sight for said camera, said front sight being slidably mounted and having at its lower end a finger which will engage one of said notches in said shutter to lock it into place when the front sight is depressed.

References Cited in the file of this patent

UNITED STATES PATENTS

| | | |
|---|---|---|
| 386,857 | Tanks | July 31, 1888 |
| 436,855 | Hetherington | Sept. 23, 1890 |
| 1,222,310 | Lichtman | Apr. 10, 1917 |
| 1,366,158 | Brown | Jan. 18, 1921 |
| 1,397,661 | Sark | Nov. 22, 1921 |
| 2,017,979 | Mayo | Oct. 22, 1935 |
| 2,379,690 | Cunningham | July 3, 1945 |
| 2,384,637 | Owens | Sept. 11, 1945 |
| 2,495,161 | Doyle et al. | Jan. 17, 1950 |
| 2,495,223 | Bodlander | Jan. 24, 1950 |
| 2,553,656 | Kirby | May 22, 1951 |
| 2,559,214 | Fried | July 3, 1951 |

FOREIGN PATENTS

| | | |
|---|---|---|
| 591,858 | France | Apr. 18, 1925 |